(12) United States Patent
Saito

(10) Patent No.: US 10,740,714 B2
(45) Date of Patent: Aug. 11, 2020

(54) MACHINE LEARNING FOR DETERMINATION OF SHIPPING RULES AND SHIPPING METHODS FOR ORDER FULFILLMENT

(71) Applicant: Shu Saito, Salt Lake City, UT (US)

(72) Inventor: Shu Saito, Salt Lake City, UT (US)

( * ) Notice: Subject to any disclaimer, the term of this patent is extended or adjusted under 35 U.S.C. 154(b) by 0 days.

(21) Appl. No.: 15/483,139

(22) Filed: Apr. 10, 2017

(65) Prior Publication Data

US 2017/0337512 A1    Nov. 23, 2017

Related U.S. Application Data

(63) Continuation of application No. 14/952,037, filed on Nov. 25, 2015, now Pat. No. 9,619,775.

(60) Provisional application No. 62/220,172, filed on Sep. 17, 2015.

(51) Int. Cl.
*G06Q 10/08* (2012.01)
*G06Q 30/06* (2012.01)

(52) U.S. Cl.
CPC ... *G06Q 10/08345* (2013.01); *G06Q 30/0635* (2013.01)

(58) Field of Classification Search
CPC .............................................. G06Q 10/08345
See application file for complete search history.

(56) References Cited

U.S. PATENT DOCUMENTS

| | | | |
|---|---|---|---|
| 6,829,037 B2 * | 12/2004 | Hill | G06Q 30/0609 |
| | | | 355/40 |
| 6,876,958 B1 | 4/2005 | Chowdhury et al. | |
| 7,117,170 B1 | 10/2006 | Bennett et al. | |
| 8,032,391 B2 | 10/2011 | Erie et al. | |
| 8,065,189 B1 | 11/2011 | Ballaro | |
| 8,086,344 B1 * | 12/2011 | Mishra | G06Q 30/0283 |
| | | | 700/214 |
| 8,244,645 B2 | 8/2012 | Malitski | |
| 8,326,679 B1 | 12/2012 | Rowe et al. | |
| 8,473,425 B1 * | 6/2013 | Maurer | G06Q 10/083 |
| | | | 705/14.42 |
| 8,560,461 B1 | 10/2013 | Tian et al. | |
| 9,619,775 B1 * | 4/2017 | Saito | G06Q 10/08345 |

(Continued)

OTHER PUBLICATIONS

Staff, "Don't Delay in Mailing Presents," Idaho State Journal, A.2, Pocatello, Idaho, Nov. 28, 2012.*

(Continued)

*Primary Examiner* — Nathan Erb
(74) *Attorney, Agent, or Firm* — Terrence J. Edwards; TechLaw Ventures, PLLC

(57) ABSTRACT

Systems, methods, and devices for determining shipping rules and shipping methods for an order are disclosed herein. A computer implemented method includes receiving an electronic record of an order placed with a merchant. The method further includes determining a smallest available package size in which the order content can be shipped and one or more additional available package sizes having dimensions larger than the smallest available package size in which the order content can be shipped. The method also includes determining a shipping price to ship the order content and presenting a plurality of shipping methods to a user with the shipping price.

23 Claims, 11 Drawing Sheets

(56) References Cited

U.S. PATENT DOCUMENTS

| | | | |
|---|---|---|---|
| 2001/0034608 A1* | 10/2001 | Gendreau | G06Q 10/08 705/334 |
| 2002/0019759 A1 | 2/2002 | Arunapuram et al. | |
| 2002/0165639 A1 | 11/2002 | England et al. | |
| 2003/0200111 A1* | 10/2003 | Damji | G06Q 10/08 705/335 |
| 2008/0262978 A1 | 10/2008 | Collings et al. | |
| 2012/0036090 A1 | 2/2012 | Skeen | |
| 2013/0103607 A1 | 4/2013 | Knipfer et al. | |
| 2013/0304639 A1 | 11/2013 | Acsay et al. | |
| 2014/0067104 A1* | 3/2014 | Osterhout | G06Q 50/28 700/97 |
| 2014/0172736 A1* | 6/2014 | Saha | G06Q 10/083 705/330 |
| 2014/0279659 A1* | 9/2014 | Seay | G06Q 10/083 705/337 |
| 2015/0088767 A1 | 3/2015 | Varadarajan | |
| 2015/0324736 A1* | 11/2015 | Sheets | G06Q 10/08 705/330 |

OTHER PUBLICATIONS

Business Wire, "Paid, Inc. Enhances AuctionInc eCommerce Software Line; AuctionInc software is based on Paid's proprietary online shipping calculation software," 1, New York, Jun. 14, 2006.*

"Reduce Costs and Save Time with Ship-It Shipping Software," http://www.adsionline.com/logisticssoftware/shipitmulticarriershippingsoftware/, Sep. 30, 2015.

Ming, Edwin Chong Lik, Ma, Nang Laik, and Tan, Kar Way, "Reducing Carbon Emission of Ocean Shipments by Optimizing Container Size Selection," 2014 IEEE International Conference on Automation Science and Engineering (CASE), Taipei, Taiwan, Aug. 18-22, 2014, pp. 480-485.

* cited by examiner

Create a Shipping Profile

L x W x H has been rearranged to descending numerical order.
Shipping profile, 30" x 25-5/8" x 2-1/2" (12 lb 3 oz), has been added successfully.
Length, width, and/or height cannot be 0".
Weight cannot be 0 lb 0 oz.
Weight cannot exceed 70 lb.
Length plus girth cannot exceed 165 inches. Girth = (Width + Height) x 2
Shipping profile you entered already exists in the database.

Product: [Enter Product Identifier] — 302

| Length | Width | Height | Weight | |
|---|---|---|---|---|
| 0 | 0/8 | 0 | 0/8 | 0 | 0/8 | 0 | 0/8 |

Add

FIG. 3

Shipping Profiles

Shipping Profiles for 10 or more items have been updated.
Shipping Profile for LT700P has been updated.
Please select a Brand.
Please select a Shipping Profile.

By Brand: [ ⇔ ] [Go]

By Shipping Profile: [ ⇔ ] [Go]

| Model # | Invoice Name | Shipping Profile |
|---|---|---|
| LT500P | LG 5231JA2002A Refrigerator Water Filter | 7" x 7" x 7" (1 lb 2 oz) |
| LT600P | LG 5231JA2006B Refrigerator Water Filter | 24-5/8" x 20-¾" x 3-1/2" (24 lb 13 oz) |
| LT700P | LG ADQ36006101 Refrigerator Water Filter | 7" x 7" x 7" (2 lb 0 oz) |
| LT800P | LG ADQ73613401 Refrigerator Water Filter | 24-5/8" x 20-¾" x 3-1/2" (24 lb 13 oz) |

| Brand | Model # | Invoice Name | Shipping Profile |
|---|---|---|---|
| Aqua-Pure | 3MFF100 | Aqua-Pure 3MFF100 Inline Full Flow Undersink Water Filter | 7" x 7" x 7" (1 lb 2 oz) |
| Clear2O | CWS100AW | Clear2O Water Filtration Pitcher | 7" x 7" x 7" (1 lb 2 oz) |
| Hydronix | SCD-25-0501 | Hydronix 5" x 2.5" Polypropylene Sediment Filter, 1 Micron | 7" x 7" x 7" (1 lb 2 oz) |
| Sprite | HOB-BN | Sprite Brushed Nickel High Output Shower Filter (without shower head) | |

[Save]

FIG. 4

Drop Ship Brands — 500

Information has been saved successfully.
One or more required fields are missing.
You cannot make [Brand] a Drop Ship Brand because there is at least one set of shipping rules that contains a [Brand] item.

| Sort Order | Drop Ship Brand | Default Shipping Carrier & Method | |
|---|---|---|---|
| 1 | Lysol ◀▶ | FedEx Ground (2-5 business days) ◀▶ | ☐ Delete |
| 1 | BHC ◀▶ | USPS Priority Mail (2-5 business days) ◀▶ | ☐ Delete |

Add Brand

Save

FIG. 5

Shipping Rules
L x W x H has been rearranged to descending numerical order.
Rules have been prepopulated based on the existing shipping rules with an exception of box weight.
Shipping rules have been updated.
Shipping profile for LT700P has been updated.
Length, width, and/or height cannot be 0".
Box weight cannot be 0 lb 0 oz.
Box weight cannot exceed 70 lb.
Length plus girth cannot exceed 165 inches. Girth = (Width + Height) x 2

| Order Content | Model # | Qty | Shipping Profile | |
|---|---|---|---|---|
| | LT700P | 1 | 7" x 5-¼" x 3" (1 lb 2 oz) | Edit |
| | ADQ73214404 | 3 | 3-¾" x 3-¾" x 2-½" (1 lb 2 oz) | Edit |

Box Dimensions L: (0) (0/8) W: (0) (0/8) H: (0) (0/8) ☐ Ship as is

Box Weight (0) lb (0) oz

☐ Check all Flat Rate & Regional Rate Box options that are the same or larger

Priority Mail
  Flat Rate Envelopes
    ☐ Flat Rate Envelope (12-½"x9-½")
    ☐ Legal Flat Rate Envelope (15" x 9-½")
    ☐ Padded Flat Rate Envelope (9-½" x 12-½")
  Flat Rate Boxes
    ☐ Small Flat Rate Box (5-3/8" x 8-5/8" x 1-5/8")
    ☐ Medium Flat Rate Box 1 (Top Loading: 11" 8-½" x 5-½")
    ☐ Medium Flat Rate Box 2 (Side Loading: 13-5/8" x 11-7/8" x 3-3/8")
    ☐ Large Flat Rate Box 1 (Top Loading: 12" x 12" x 5-½")
    ☐ Large Flat Rate Box 2 (Side Loading: 24-1/16" x 11-7/8" x 3-1/8")
  Regional Rate Boxes
    ☐ Regional Rate Box A1 (Top Loading: 10-1/8" x 7-1/8" x 5")
    ☐ Regional Rate Box A2 (Side Loading: 13-1/16" x 11-1/16"x 2-½")
    ☐ Regional Rate Box B1 (Top Loading: 12-¼" x 10-½" x 5-½")
    ☐ Regional Rate Box B2 (Side Loading: 16-¼" x 14-½" x 3")
    ☐ Regional Rate Box C (15" x 12" x 12")

Priority Mail Express
  Flat Rate Envelopes
    ☐ Flat Rate Envelope (12-½"x9-½")
    ☐ Legal Flat Rate Envelope (15" x 9-½")
  Flat Rate Boxes
    ☐ Medium Flat Rate Box 1 (Top Loading: 11" 8-½" x 5-½")
    ☐ Medium Flat Rate Box 2 (Side Loading: 13-5/8" x 11-7/8" x 3-3/8")

Box Quantity (1) *Additional box(es) must have the same dimensions and weight

[Add a Box] (If additional box(es) have different dimensions and/or weight)

FIG. 6

Shipping Methods/Label Creation

Original Address
123 Main Street
Some City, WI 12345
[Select]

Suggested Address
123 Main Street
Some City, WI 12345-6789
[Select]

Order Content: ADQ73214404 -- Qty: 3; LT700P -- Qty: 3 [Edit]

Shipping Method: $5.70 -- USPS Priority Padded Flat Rate Envelope (2-5 business days)

Ship Date: Thursday 11/12/2015

[Update]

[Create a Label]

Shipping Methods/Label Creation

Original Address
123 Main Street
Some City, WI 12345
[Select]

Suggested Address
123 Main Street
Some City, WI 12345-6789
[Select]

Order Content: ADQ73214404 -- Qty: 3; LT700P -- Qty: 3 [Edit]

Shipping Method:

Ship Date:

- ✓ $5.70 -- USPS Priority Padded Flat Rate Envelope (2-5 business days)
- $7.55 -- USPS Priority Mail Non-flat Rate (2-5 business days)
- $7.55 -- USPS Priority Mail Regional Flat Rate Box A (2-5 business days)
- $9.18 -- FedEx Ground Delivery (2-5 business days)
- $10.66 -- USPS Priority Mail Regional Rate Box B (2-5 business days)
- $11.30 -- USPS Priority Mail Medium Flat Rate Box (2-5 business days)
- $12.55 -- FedEx Express Saver (3 business days)
- $15.80 -- USPS Priority Mail Large Flat Rate Box (2-5 business days)
- $16.62 -- FedEx 2 Day (2 business days)
- $18.11 -- USPS ExpressMail Padded Flat Rate Envelope (1-2 business days)
- $19.78 -- USPS Priority Mail Regional Rate Box C (2-5 business days)
- $27.43 -- USPS Express Mail Non-flat Rate (1-2 business days)
- $34.37 -- FedEx Priority Overnight (next business day)
- $44.95 -- USPS Express Mail Flat Rate Box (1-2 business days)

[Create a Label]

700

MACHINE LEARNING FOR DETERMINATION OF SHIPPING RULES AND SHIPPING METHODS FOR ORDER FULFILLMENT

TECHNICAL FIELD

The disclosure relates generally to methods, systems, and apparatuses for order fulfillment and more particularly relates to intelligent automated package and shipping method selection for orders.

BACKGROUND

Online, catalog, and even brick and mortar retailers or merchants often fulfill customer orders by shipping products to the customer. Shipping volumes and innovations have led to increased competition, reduced shipping costs, and a wide range of options to customers and merchants for shipping products.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 3 illustrates a shipping profile creation interface, according to one implementation;

FIG. 4 illustrates a shipping profiles interface, according to one implementation;

FIG. 5 illustrates a drop ship interface, according to one implementation;

FIG. 6 illustrates a shipping rules interface, according to one implementation;

FIG. 7A illustrates a shipping methods/label creation interface, according to one implementation;

FIG. 7B illustrates a shipping methods/label creation interface with an expanded drop-down menu, according to one implementation;

DETAILED DESCRIPTION

With the wide array of shipping options, it is important that merchants and/or customers are able to quickly and efficiently choose package and shipping options that best match their desires. Thus, retailers or shippers may need to determine how to best ship products within an order. For example, when an order is received, an employee may take a plurality of ordered items and try to fit them into a few different box or envelope sizes. Furthermore, the employee may need to determine which shipping methods or which of the available packages to use to ship the order. However, Applicant has recognized that significant cost and time is currently wasted on determining which available packaging an order can fit in and selecting shipping methods. This process can be exacerbated because one merchant may have shipping packages that they stock and which another merchant does not stock. Additionally, errors are often made where more expensive packaging or shipping methods are used than could have been used.

For the foregoing and other reasons, Applicants have developed systems, devices, and methods for order fulfillment that improve packaging and shipping method selection based on previous orders. In one embodiment, methods, devices, and systems may benefit any shipper, such as an online retailer or other order fulfillment service provider. For example, merchants who fulfill orders using available shipping methods from available carriers (such as USPS, FedEx, UPS, or the like) or ship small to medium size items may benefit from automated package and method selection. For example, machine learning or package and method selection based on previous orders may enable a retailer to significantly reduce costs and time to ship an order as well as to reduce costs paid for shipping services by a carrier. Machine learning may include analysis of or referring back to one or more previously shipped orders to make predictions or selections for future orders.

In one embodiment, a computer implemented method includes receiving an electronic record of an order placed with a merchant, wherein the electronic record indicates an order content comprising a plurality of items for the order. The method also includes determining a smallest available package size in which the order content can be shipped and automatically determining, based on the smallest available package size, one or more additional available package sizes having dimensions larger than the smallest available package size in which the order content can be shipped. The method includes calculating, for each of the smallest available package size and the one or more additional available package sizes, a shipping price to ship the order content. The method includes presenting a plurality of shipping methods for shipping for each of the plurality of available package sizes having shipping rules, wherein each of the plurality of shipping methods comprises a package identifier and a shipping price.

Figure 1:
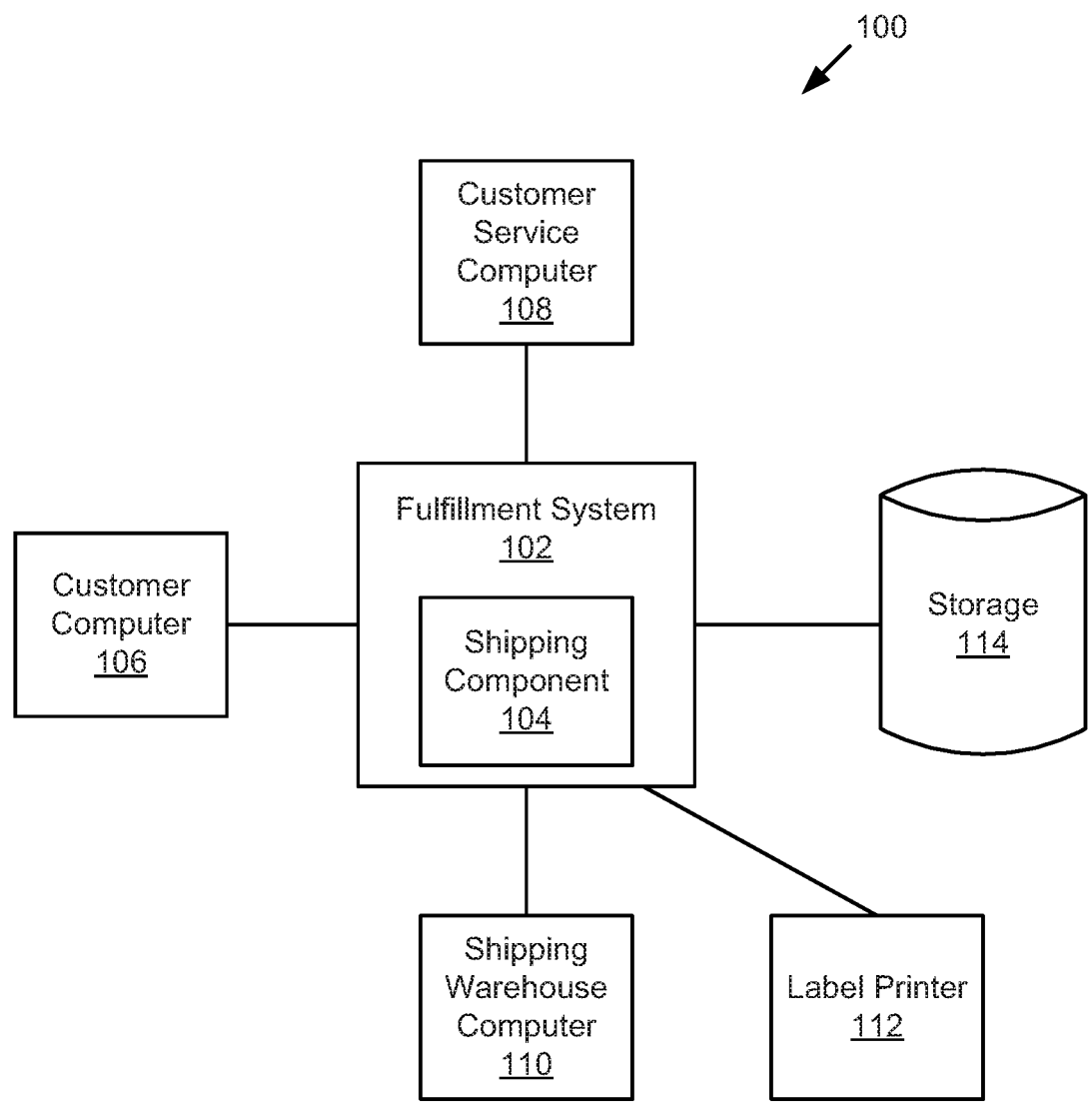
FIG. 1 is a schematic block diagram illustrating a system for receiving and processing orders placed with a merchant, according to one implementation.

Referring now to the figures, FIG. 1 illustrates an example system 100 for receiving and processing orders. The system 100 includes a fulfillment system 102 that includes a shipping component 104, a customer computer 106, a customer service computer 108, a shipping warehouse computer 110, a label printer 112, and data storage 114. The different components 102-114 may communicate directly with each other or via a network, such as a local area network, a wide area network, and/or the Internet. The components 102-114 are given by way of example only. Furthermore, interconnections between and locations of the components are illustrative only. For example, the shipping component 104 may be located separately from the shipping component 104 or may be part of another component or any of the other components 106-114 of the system 100.

The fulfillment system 102 is configured to receive and process one or more orders from customers. For example, the order information may be received from a customer computer 106 or a customer service computer 108. The storage 114 may include information about available products, their prices, and other details. The storage 114 may also be used to store order information, customer information, or other information for usage by the fulfillment system 102. The fulfillment system 102 includes a shipping component 104 configured to determine one or more shipping details for an order. For example, the shipping component 104 may determine packaging, shipping methods, or the like based on an order and will be discussed in further detail below. The shipping component 104 may provide an interface to shipping employees on a shipping warehouse computer 110. The shipping details may be provided to the shipping warehouse computer 110 and/or to a label printer 112 for printing of a label to initiate packaging and shipping of a customer's order.

The fulfillment system 102 may include one or more servers located remotely from a customer computer 106 or other components of the system 100. For example, the customer computer 106 may include a computing device, such as a desktop, laptop, tablet, or mobile computing devices, which access a web page provided by the fulfillment system 102 in order to browse available products and/or place orders for products. The fulfillment system 102 may also receive orders from a customer service computer 108. For example, the customer computer 106 may be operated by a merchant or employee of a merchant. The customer service computer 108 may be used to enter order and payment details received by a customer service representative from a customer via phone, email, or in any other manner. The order details, including any payment details, may be provided from the customer computer 106 or the customer service computer 108 to the fulfillment system 102 for processing.

The fulfillment system 102 may include a product inventory system that determines whether one or more products are available for ordering, shipping, or purchasing. For example, while a customer browses a website provided by the fulfillment system 102, or an employee takes an order from a customer, the fulfillment system 102 may provide information about whether specific products are available and/or when the products will be available. For example, a potential customer browsing a merchant's website may be able to search and view products available for purchase from the merchant. The fulfillment system 102 may pull data from the storage 114 to populate the website to indicate availability of products.

The fulfillment system 102 may include a payment component or payment processing system that process an order price and customer payment details to process payment for an order. For example, the payment component or system may process an electronic transfer, electronic check, payment card details, or any other payment information to initiate payment from a customer to a merchant. The payment component or system may validate that the payment details are valid or that payment for the order has been received.

Figure 2:
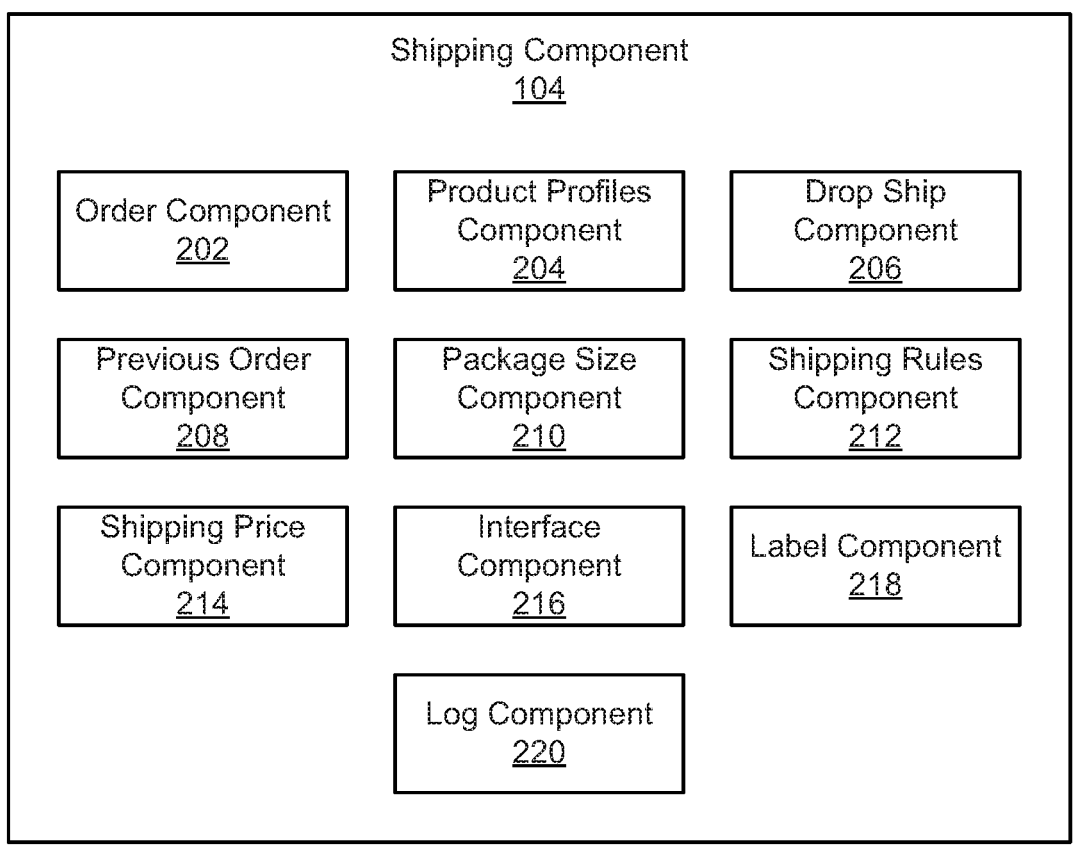
FIG. 2 is a schematic block diagram illustrating example components of a shipping component, according to one implementation.

FIG. 2 is a schematic block diagram illustrating components of shipping component 104, according to one embodiment. The shipping component 104 includes an order component 202, product profiles component 204, a drop ship component 206, a previous order component 208, a package size component 210, a shipping rules component 212, a shipping price component 214, an interface component 216, a label component 218, and a log component 220. The components 202-220 are given by way of example and may not all be included in all embodiments. For example, a shipping component 104 may include only one or any combination of two or more of the components 202-202.

The order component 202 is configured to receive an electronic record of an order placed with a merchant. For example, the electronic record may include an indication of an order placed by a customer using a customer device via a network or an order entered by a customer service representative on behalf of the user. The electronic record may indicate include information about a customer and and/or one or more products ordered by the customer. For example, the electronic record may include a customer name, mailing address, phone number, email address, or any other identifying or contact information. The electronic record may also include customer payment information such as a payment card number, account number, or other financial account identifier or payment information.

The electronic record also may include an indication of order content. For example, the indication of order content may include identifiers for a plurality of items ordered by the customer. The order content may include one or more product names, inventory identifiers (e.g., stockkeeping unit (SKU) number) for one or more different products, and a quantity for the products. The order component 202 may determine one or more products, and a quantity for each of the one or more products that are included in the order content.

The product profiles component 204 is configured to store shipping profiles for a plurality of products available for shipping by the merchant. For example, each product available in inventory or each product which is sold by a merchant, may have a corresponding shipping profile that includes a physical description of the product as it will be shipped. In on embodiment, the shipping profiles include dimensions and weight for each of the plurality of products available for shipping by the merchant. The dimensions may include a length, a width, and a height. In one embodiment, the dimensions may include greater detail for products that do not have cuboid or rectangular prism shape. In one embodiment, the shipping profiles also include a weight of the product. In one embodiment, the shipping profiles may include dimensions, weight, or other details provided by a party that manufactures or supplies the product to the merchant. In one embodiment, the shipping profiles may be entered by the merchant or an employee of the merchant. The shipping profiles may be stored for later access by a fulfillment system 102 or shipping component 104, such as within the storage 114 of FIG. 1.

The drop ship component 206 is configured to identify one or more products within the order content of an order that should be drop shipped. Drop shipping generally refers to a practice where an order is placed with a specific merchant, but a different party, such as an original manufacturer or supplier, actually ships the order to a customer. For example, even though the order is placed with a specific merchant, the merchant may not ship the product and instead allow a different party with to ship the product. This may allow a merchant to receive income for selling products on behalf of another supplier without actually having inventory of the product.

In one embodiment, the drop ship component 206 identifies one or more products in an order that correspond to a brand or product marked for drop-shipping. For example, a list of drop shipped products by product identifier, brand identifier, or other category may be stored by the storage 114 of FIG. 1. The list may be accessed by the drop ship component 206 to determine whether any items within the order content are in the list of drop shipping items. If an item is in the list of drop shipped products, the drop ship component may eliminate one or more products from the order content, as far as the previous order component 208, package size component 210, shipping rules component 212, and shipping price component 214 are concerned. For example, the components 208-220 may operate as if the order does not include the drop shipped products because they may not actually be included in a package shipped by the merchant.

The previous order component 208 is configured to identify one or more previous orders that match the current order. For example, a previous order may match a current order by having the same order content or similar order content. In one embodiment, the previous order component may determine whether a previous order matches a current order based on one or more drop shipped items being excluded from the current order or the previous order. In one embodiment, a previous order may have the same order content if the contents of the order exactly match the contents of the previous order. For example, the order contents of both orders may include the exact same products and the exact same quantity for each product. In one embodiment, the previous order component 208 may determine that the order and a previous order have the same order content based on matching product identifiers and quantities. For example, the order contents for both orders may include the same SKUs and quantities corresponding to the SKUs. The previous order and new order may have a same one or more products and a same quantity for the one or more products.

In one embodiment, the previous order component 208 may compare the order content of a recently received order with one or more records of previous orders stored within an order log. For example, the previous order component 208 may compare the order content of a current order to order contents of boxes or packages previously shipped by the merchant. The log may include a record of each box or package shipped that has a specific order content. The record of the previously shipped box or package may include an indication of one or more products included in the package, the packaging type or size used to ship the order content, a quantity for the one or more products, a weight for each of the one or more products, dimensions for each of the one or more products, and/or a final shipping weight for the package including the products, package (box or envelope), a smallest box or package in which the order content fit, and/or any packing material. In one embodiment, if a previous order exactly matches a current order, one or more or all of the details from the record (e.g., final shipping weight, package or box dimensions, and/or the like) of the previously shipped box or package may be used for shipping the current order. By comparing the order content of the current order to the order content of previously shipped boxes or orders, employee effort and/or computation by the fulfillment system may be significantly reduced. For example, if the order content of a current order matches the previous order content, the information about the previous order content may be used for the current order to reduce the need to recalculate or re-determine how to ship the order content of the current order. Furthermore, reduction in employee errors where products are shipped using other than a lowest cost shipping option, including packaging and/or shipping rates.

In one embodiment, the previous order component 208 may locate an order that does not have the same order content, but instead has a similar order content. In one embodiment, orders may have similar order content when they have a same quantity of products and the products have the same or similar shipping profiles. For example, one or more products of the previous order (or previously shipped package) may not exactly match the current order, but may instead have same or similar dimensions. For example, each of a length, width, and height of the different products may be identical or within a threshold percentage or unit length. As another example, a longest dimension, middle dimension, and shortest dimension may be required to match exactly between different products in order for the previous order component 208 to determine that the order content is similar. In one embodiment, the weight of different products being different may not keep the previous order component 208 from determining that an order content is similar.

In one embodiment, the previous order component 208 may compare dimensions of a shipping profile for each product in a current order with dimensions of products in previous orders or previous packages. For example, the previous order component 208 may search for matching product dimensions (exactly matching or at least within a threshold value) rather than matching products. In this way, the previous order component 208 may identify previous orders that, although not identical, may still provide specific information about how the current order can or should be shipped.

In one embodiment, when the previous order component 208 locates a previous order with similar order content in a log of previous orders, the previous order component 208 may pull information about packaging size, packaging type, final shipping weight or the like. In one embodiment, the previous order component 208 may also pull specific weights of one or more products included in a similar or matching previous order. For example, the weights of the specific products may be used to calculate a weight for the current order. In one embodiment, a weight for the current order may be calculated by subtracting a weight for a first product in a previous order from a final shipping weight of the previous order and adding the weight of a different second product that is in the current order that has the same or similar dimensions as the first product.

In one embodiment, the previous order component 208 may determine that there is no previous order that has the same order content or a similar order content to the order content of a current order. In one embodiment, the previous order component 208 may notify the log component 220 to add information about the current order to the log of previously shipped orders. For example, after the current order has been packaged, weighed, and shipped, the log component 220 may store information about the current order to the log. Thus, any future orders that have the same or similar order content as the current order may then be processed with less computing or employee resources.

The package size component 210 is configured to determine a smallest package size that can be used to ship the order content of the current order. In one embodiment, the package size component 210 may determine the smallest package size based on a reduced number of order contents due to elimination of one or more products by the drop ship component 206.

In one embodiment, the package size component 210 is configured to determine the smallest available package size that can be used to ship the order contents based on information provided by a user. For example, a user may provide, in an interface an indication of a smallest available box or package size that can be used to ship the order contents. The user interface may present a plurality of different package options and the user may be able to select a box in which the contents will fit. For example, the user may gather the order contents and try one or more boxes to determine which of the available boxes is large enough to accommodate all of the order contents (except, for example, any drop shipping products).

In one embodiment, the package size component 210 is configured to determine the smallest package size based on a previous order that had the same or similar order content as a current order. For example, if the previous order component 208 identified a previous order from a log that has the same or similar order content, the package size component 210 may pull information from the log to determine the smallest available box size that the order content of the current order will fit in. In one embodiment, the records of previously shipped orders in the log indicate a smallest package size in which the contents will fit. For example, the record of a previously shipped order may include information about a package that was actually used to ship the order and/or information about a smallest package size that would accommodate the order contents. In one embodiment, the record of a previously shipped order may include a list of all available package sizes that would accommodate the order content.

In one embodiment, the package size component 210 is configured to determine one or more additional package sizes in which the order content of the current order will fit. The package size component 210 may identify which available package sizes can accommodate the order from a list of package sizes available to a merchant. For example, the merchant may keep one or more box, envelope, or other package sizes in stock to use for shipping products. By using the available box sizes, the merchant may be able to save costs associate with stocking a large number of different boxes or creating custom sized boxes for orders. In one embodiment, the available box or package sizes may include one or more regional rate boxes or envelopes, one or more flat rate boxes or envelopes, or the like. For example, some carriers offer flat rate or regional rate boxes that can, in some situations, provide better rates than even smaller packages sizes.

In one embodiment, the package size component 210 may identify one or more additional package sizes in which the contents will fit based on the smallest available package size in which the content will fit. For example, the package size component may identify the additional package sizes based on the smallest available package size indicated by a user or determine from a previous order with a same or similar order content. In one embodiment, all boxes that are larger in one or more dimensions than the smallest available package size may be selected. For example, if all dimensions of a specific box are the same or greater than dimensions of the smallest available box size, the package size component 210 may identify that specific box size as one in which the order content can be shipped.

In one embodiment, the package size component 210 identifies the one or more additional packages sizes based on a previously shipped order. For example, if the previous order component 208 identified a previous order that had the same or similar order content as a current order, the package size component 210 may pull information about one or more available box sizes that the previous order would fit in. The package size component 210 may determine that if the previous order with the same order content could fit in the one or more additional available box sizes, then the current order may also fit within those additional available box sizes.

The shipping rules component 212 is configured to determine one or more shipping rules to ship order content of an order. The shipping rules component 212 may determine the shipping rules based on order content that eliminates any drop shipped items ordered by a customer. In one embodiment, the shipping rules component 212 may determine shipping rules including one or more of package dimensions, shipping weight, or the like. In one embodiment, the shipping rules component 212 may retrieve the package size and any additional package sizes from the package size component 210 for inclusion in the order rules. In one embodiment, the shipping rules component 212 is configured to determine shipping rules comprising packaging dimensions and a final shipping weight for each of the smallest available package size and the one or more additional available package sizes.

In one embodiment, the shipping rules component 212 determines the shipping rules based on information provided by a user into an interface. For example, a user may provide box dimensions or weight into the example interface of FIG. 6. The shipping rules component 212 may use the input as the shipping rules or use the input to calculate shipping rules.

In one embodiment, the shipping rules component 212 is configured to automatically determine one or more or all shipping rules without user input. For example, the shipping rules component 212 may determine the shipping rules based on information in a record of a previously shipped order stored in a log and/or identified by the previous order component 208. In one embodiment, the shipping rules component 212 is configured to determine dimensions for one or more package sizes based on the previous order. For example, if the previous order used a box with specific dimensions, the shipping rules component 212 may use the box with the specific dimensions for the shipping rules. Similarly, the shipping rules component 212 may also pull information regarding a smallest available box size and/or one additional available box sizes from the previous order.

In one embodiment, the shipping rules component 212 may automatically determine a weight (or a final shipping weight) for one or more different box sizes. For example, the shipping rules component 212 may determine the weight based on a previous order having a same or similar order content. For example, using the weight of the previous order, the shipping rules component 212 may calculate a weight for the current order. In one embodiment, for the same order content in the same packaging as the previous order, the shipping rules component 212 may determine that the current order will have the same final shipping weight as the previous order. In one embodiment, for different order content in the same packaging, the shipping rules component 212 may determine that the current order will have a different final shipping weight. For example, the previous order may include a first product that has a first weight and the dimensions of the first product may be the same or similar to a second product in the current order that has a different, second weight. The shipping rules component 212 may calculate a final shipping weight for the current order by subtracting a weight of the first product from the finals shipping weight of the previous order and adding the weight of the second product.

In one embodiment, the shipping rules component 212 may determine rules for a plurality of different box sizes for the same order. Determining shipping rules for a plurality of different box sizes may allow estimation of costs for a plurality of different shipping methods. In one embodiment, the shipping rules component 212 may determine a final shipping weight for each available box size for the order content. For example, the shipping rules component 212 may substitute weights of different box sizes to calculate final shipping weights for orders that use a different box size than an actual box size used to ship a previous order.

The shipping price component 214 is configured to determine a shipping price for one or more packaging options for order content of an order. In one embodiment, the shipping price component 214 is configured to determine the shipping price based on one or more drop shipped products being eliminated from the order content. In one embodiment, the shipping price component 214 is configured to determine the shipping price based on the shipping rules determined by the shipping rules component 212. For example, the shipping price component 214 may calculate a shipping price for one or more of the package sizes in which order content will fit. In one embodiment, the shipping price component 214 may calculate a shipping price for each of the smallest available package size and the one or more additional available package sizes. For example, the shipping price component 214 may receive shipping rules, including dimensions and weight, for each of the different packages and determine a price to ship the order content in that packaging. In one embodiment, calculating a shipping price may include calculating based on a weight for a previous order and based on a difference in weight between one or more products of the order and one or more products of the previous order.

In one embodiment, the shipping price component 214 may determine a shipping price based on different shipping methods. For example, different shipping methods may be with different carriers, with different shipping speeds, different packaging, or the like. In one embodiment, the shipping price component 214 may determine a price for a specific carrier by submitting shipping rules to an application program interface (API) of the carrier and receive a shipping price back via the API. In one embodiment, the shipping price component 214 may determine a shipping price for a plurality of shipping methods available for the order content.

The shipping price component 214 may also identify a lowest cost shipping method and/or packaging based on the calculated shipping prices. The lowest cost shipping method may use a package that uses a packaging having a larger size than a smallest available package. For example, flat rate or regional rate packaging and shipping methods may be cheaper than other shipping methods that use smaller packages. In one embodiment, the shipping price component 214 may select a lowest cost shipping method for shipping the order content, even if it has larger dimensions that the smallest available box size that will fit the order content. In one embodiment, the shipping price component 214 may select a lowest cost shipping method and provide that information to an automated packaging system. For example, an automated packaging system may automate one or more of product retrieval, package retrieval, product loading within a package, taping, and/or attaching of a label. In one embodiment, the automated packaging system may receive the order and/or shipping details and automatically perform one or more aspects of packaging including using a box, label, and/or shipping method indicated by other components of the shipping component 102 or fulfillment system 102. The automated packaging system may include one or more actuators, conveyor belts, taping mechanisms, and/or label printers to automate at least some portions of a package assembly and shipping process.

The interface component 216 is configured to provide user interfaces for a user. For example, the interfaces may be presented to a user at a shipping location, such as on a shipping warehouse computer 110 in FIG. 1. The interface component 216 may provide an interface for communicating with a user. For example, the interface component 216 may provide a visual interface for displaying information and receiving input from a user. The interface component 216 may provide an interface that can receive keyboard, mouse, touch screen, voice, or any other type of input from a user. Example interfaces which may be provided by the interface component are illustrated in FIGS. 3-8, which are discussed further below.

In one embodiment, no interface for shipping an order may be displayed because the shipping component 104 may automatically identify previous orders with the same order content, determine shipping rules, calculate prices, determine an optimal packaging and shipping methods, and print a label without user input or approval. In another embodiment, the same interfaces may be used to obtain approval even when a previous order with the same order content has been identified. For example, a user may be allowed to confirm or modify shipping rules or shipping methods to oversee the label creation and shipping process.

The label component 218 is configured to print a label for shipping an order. In one embodiment, the label component 218 may pull information from an electronic order or other components to generate an electronic shipping label for an order. In one embodiment, the label component 218 may automatically populate fields of an electronic label based on a user-selected or system-selected shipping method and print a label for the order. The label component 218 may send the electronic shipping label to a printer. In one embodiment, the shipping label may be printed with a box or package identifier. A shipping employee may then take the shipping label and retrieve the correct packaging and products to prepare for shipping.

The log component 220 is configured to log an order to a previous order log. For example, if the previous order component 208 determines that a current order does not have a same or similar order content as any other previous order in the previous order log, the log component 220 may log one or more details about the order and one or more shipping rules to the order log. For example, the log component 220 may log one or more of the order content of the order, dimensions for products within the order content, the smallest available package size for the order content, the one or more additional available package sizes, and a final shipping weight for at least one of the plurality of available package sizes.

Turning to FIGS. 3-8, example operation of the system 100 of FIG. 1 is illustrated. Specifically, FIGS. 3-8 illustrate example interfaces which may be provided to a user for shipping products in response to an order. The interfaces will be discussed in relation to shipping an order by a merchant or employee of a merchant.

FIG. 3 illustrates one embodiment of a shipping profile creation interface 300. The shipping profile creation interface 300 includes a product field where a product identifier can be entered. Dimensions including length, width, and height as well as weight of a product can be entered using the interface. The dimensions and weight may be for the product as it will be shipped within or without packaging. For example, the dimensions and weight may be for a product with any individual product packaging such as shrink wrap, box, labels, paper or cardboard wrapping, or other parts of the individual packaging. Once details of the shipping profile have been entered, an add button may be selected to add the shipping profile to a list of shipping profiles. For example, using the shipping profile creation interface 300 of FIG. 3 a user may assign a shipping profile to each product. In one embodiment, the shipping profile creation interface 300 may re-order dimensions of a product in a predefined order. For example, the dimensions may be listed in order of descending or ascending length (e.g., longest dimension, middle dimension, shortest dimension).

FIG. 4 illustrates an embodiment of a shipping profiles interface 400. The shipping profiles interface 400 displays a list of example shipping profiles for a plurality of products. Some products may not yet have shipping profiles and can be filled in either manually by a user, such as by using the interface of FIG. 3, or may be automatically populated from a database or data aggregator. In one embodiment, shipping profiles for products may be automatically populated based on information provided by a supplier.

FIG. 5 illustrates a drop ship interface 500 for listing or defining products or brands of products that are to be drop shipped. For example, if a merchant offers both in-stock and dropship items, a merchant may need to track which items or brands are drop shipped. Drop shipping is a term used to reference a practice of receiving an order for an item by a first party, but having the item actually shipped by a separate party, such as the supplier or manufacture of the item. Thus, a merchant may be able to list items as being sold by the merchant and may allow customers to place orders with the merchant, but let a different party actually ship an item to a customer. Using the drop ship interface 500, a merchant may be able to indicate a brand or product that will be drop shipped. In one embodiment, the drop ship component 206 may reference items and brands marked for drop shipping and exclude them from the order content for purposes of creating a package for shipping other contents of the order.

FIG. 6 illustrates a shipping rules interface 600 for displaying or entering shipping rules. The shipping rules may be entered by a user in the interface and/or some details may be auto populated by a shipping rules component 212. For example, when an order is received, a merchant, or merchant system, may initiate shipping for the order. A shipping component 104 may review a quantity and shipping profiles in the order to check to see if shipping rules for this order content already exist. If the shipping rules for the order content already exist, for example in a log of previous orders, the shipping rules interface 600 may be auto populated with the shipping rules for review/confirmation from a user or the shipping rules interface 600 may be skipped.

In one embodiment, if the dimensions and the quantities or products in the shipping profiles of a current order and previous order match exactly, all of the shipping rules, except for the box weight information, will be entered automatically based on existing shipping rules. For example, if two different products have the same dimensions, they may be interchanged (except for weight) in an existing shipping rule. For example, the same shipping rule (except for weight) may be used since the products have the same dimensions as in the existing shipping rule.

Following is a description of the parts of the shipping rules interface 600. The order content section describes the content of an order. In one embodiment, shipping rules are set according to the quantity and shipping profiles for the order content. The box dimensions section include the box dimensions for a box for the smallest box size that a merchant carries that the order content will ship in. For example, a user may manually enter these dimensions or they may be autopopulated based on a previous order that has the same or similar order content. In the box dimensions section is a "Ship as is" checkbox. For example, if the item can be shipped in its original product box as provided to the merchant by a supplier, a user may enter the dimensions for the product box and select "Ship as is." The box weight section includes a final shipping weight for the box, including the products and any filler and/or marketing items (such as packing peanuts, packing air bags, brochures, etc.) that are included in that order content. The priority mail section includes a listing of priority mail boxes. In the embodiment, of FIG. 6 USPS Priority Mail flat rate envelopes and boxes and regional boxes are listed. A user, or a system, may select all options that the order content can fit into. If any of the sizes also exist in the priority mail express section, they will be checked automatically.

The priority mail express section includes a listing of USPS Priority Mail Express flat rate envelopes and boxes. In one embodiment, none of the boxes in this section are checkable, as all of these sizes also are listed in the priority mail section. For example, when the matching size is checked in the priority mail section, the same size option will be automatically checked in the priority mail express section. Above the priority mail section is a "Check all Flat Rate & Regional Rate Box" checkbox. Checking the "Check all Flat Rate & Regional Rate Box" checkbox this option will cause the shipping rules interface 600 or the package size component 210 to automatically select all boxes that are the same size or larger than the selected box dimensions. In one embodiment, the option to automatically check larger boxes or packages does not apply to envelopes, and the user may still need to manually select any applicable envelope options. A user may also allow a user to check for other box sizes that the order content will fit into, because the dimensions in the box dimensions section are for the smallest box that is available, rather than the actual dimensions for the order content.

The box quantity section lists a quantity for a number of boxes to be shipped. For example, if order content will not fit into a single box, the order content may be split between multiple boxes. In one embodiment, a value of two or more for the box quantity will cause the flat rate/regional box options to disappear. For example, if an order requires shipping in two or more boxes, it is a larger order and the benefits of using flat rate/regional shipping may not apply. An "Add a Box" button is listed below the box quantity section. Selection of the "Add a Box" button may cause the addition of another box with additional sections. The additional box may allow a user to choose a second set of dimensions and a weight for another, different sized box. This option may not show the flat rate/regional box options.

It should also be noted that, if there is a previous order having a same or similar order content, a message may be displayed that indicates that that the rules have been pre-populated based on the existing shipping rules with an exception of box weight. In one embodiment, if the dimensions and the quantities in the shipping profiles match exactly (e.g., matching dimensions but not matching products or weights), all of the shipping rules, except for the box weight information, will be populated automatically based on existing shipping rules. In this case, a user may only have to enter the box weight information.

FIGS. 7A and 7B illustrate one example of a shipping methods/label creation interface 700. The shipping methods/label creation interface 700 includes a shipping address section listing a shipping address for a customer, an order content section listing order content of an order, a shipping method section with a drop-down menu for selecting a shipping method, and a ship date section for selecting a data on which the order will be shipped. FIG. 7B illustrates the shipping methods/label creation interface 700 with the drop down list in the shipping method section expanded. The shipping methods/label creation interface 700 also includes a create a label button to initiate printing of a label and an update button for updating a label based on one or more changes made by a user. In one embodiment, the specific box or envelope in which the order is to be shipped is printed on the label in a "note/comment" field or other available field. Almost all shipping APIs (application programming interface) provide an optional note or comment field that the merchant can use for any purpose. This may give a shipping employee a clear indication of which box to retrieve in order to ship the content.

In one embodiment, default settings may be configured to reduce shipping costs. As an example, if the least expensive shipping option is a non-flat USPS Priority Mail box or FedEx/UPS Ground and the second least expensive option is a USPS Priority Mail Flat Rate Envelope/Box and the difference in cost is a threshold amount or less (e.g., $2.00 or less), the system may default to selecting the USPS Priority Mail Flat Rate Envelope/Box as the default shipping method on the label creation page. This example may be used, for example, in the case that all USPS supplies are free, while purchasing cardboard boxes can cost anywhere from $0.40 to $2.00 per box.

In one embodiment, a merchant or merchant employee may choose a shipping method from a drop down menu. The shipping options in the drop-down menu may be sorted by price, with the least expensive at the top and the most expensive at the bottom, or according to some other order. For example, the system may retrieve prices for one or more shippers through respective APIs (e.g., a USPS price may be retrieved via a USPS API that provides exact prices for the order based on one or more shipping rules and a customer code or the like provided by a user's computer). When sending weight information to a shipper via an API (e.g., to receive a shipping price), the system may round up the ounce (oz) to the nearest pound (lb) if it is a threshold number of ounces or higher and round down to the nearest pound, otherwise. This may be useful, for example, in cases that a shipper does not accept ounces or decimal points for box weight.

The systems and methods disclosed herein may greatly increase savings for shipping, for example, by identifying cost saving usages of flat rate and regional rate options. Merchants may be able to gain greater costs savings by clearly identifying a lowest cost shipping price as well as by reducing employee time or computer processing time in preparation of orders for shipping. For example, because certain embodiments are able to identify and compare a plurality of different shipping options that are specific to the order content, a lowest cost option can easily be determined. Merchants may obtain further benefit because some embodiments allow a user to set specific shipping rules per order content in regards to flat rate and regional rate options from one or more carriers while most other shipping label systems automatically generate shipping options based on the order content for only one carrier or shipping method. Merchants may also benefit from some embodiments because a plurality of different package sizes are identified and compared. Merchants may further benefit because some embodiments only prompt a user for shipping rules if that specific order content is being shipped for the first time. For future orders that have the exact same order content (or even similar order content), a user may not have to set shipping rules again, but instead will be able to skip directly to a label creation page. As time goes on and more orders are shipped, shipping employees may need to set shipping rules on a less frequent basis. In one embodiment, a system will be able to identify when a shipping profiles' dimensions and the quantities match existing shipping rules. This can allow pre-population of matching shipping rules saving the merchant time and processing time for computing systems.

Figure 8:
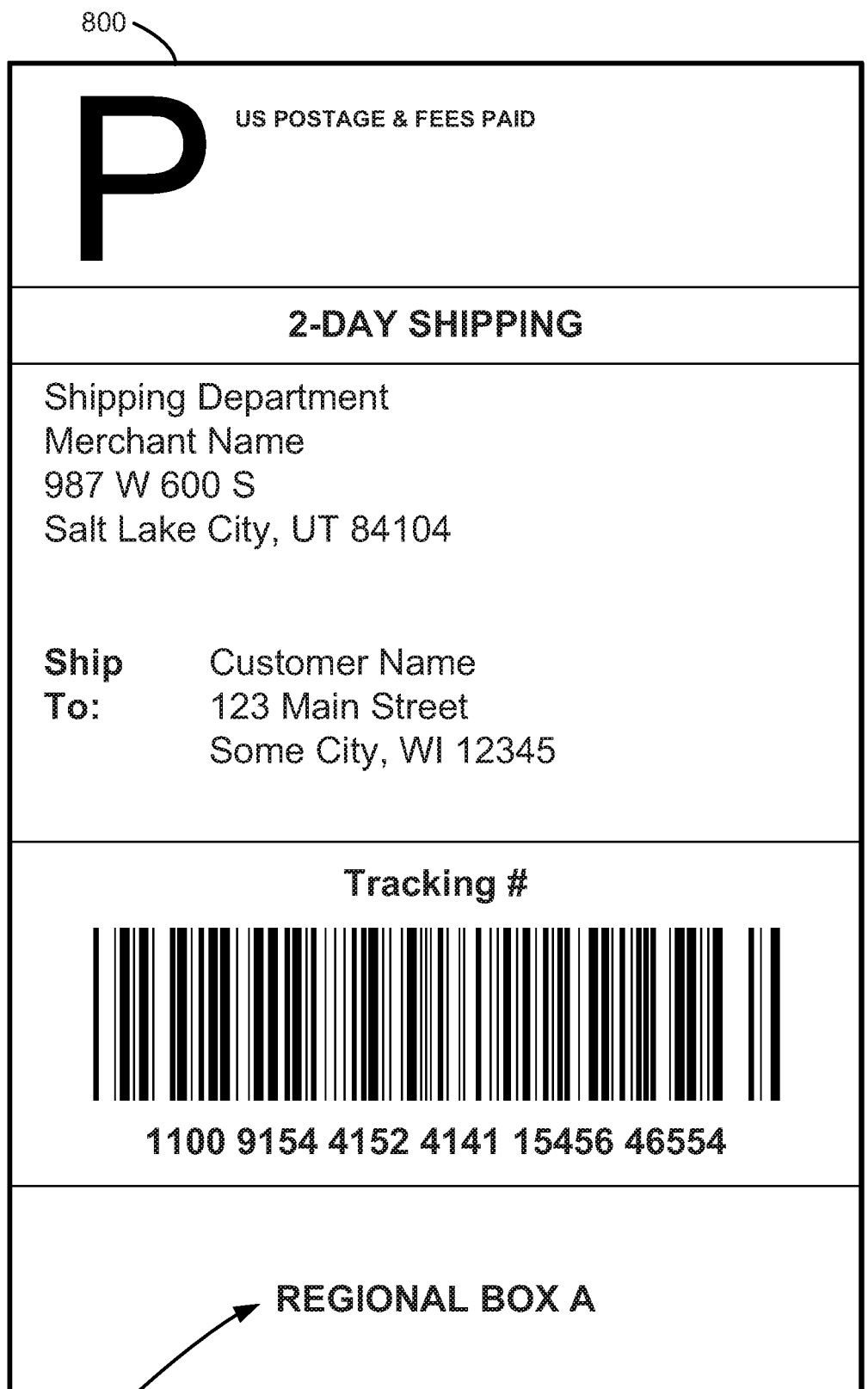
FIG. 8 illustrates a printed label, according to one implementation.

FIG. 8 illustrates one embodiment of a label 800 that may be printed by the label component 218. The label 800 includes a notes region that indicates a box size 802 for the order. For example, most shipping labels include a region where a shipper can enter any notes or any instructions. The label component 218 may automatically include a box size in the notes so that the label includes an explicit indication of the packaging size that should be used to ship the content. For example, the label 800 may have all the information needed for a shipping employee to fill the order.

Figure 9:
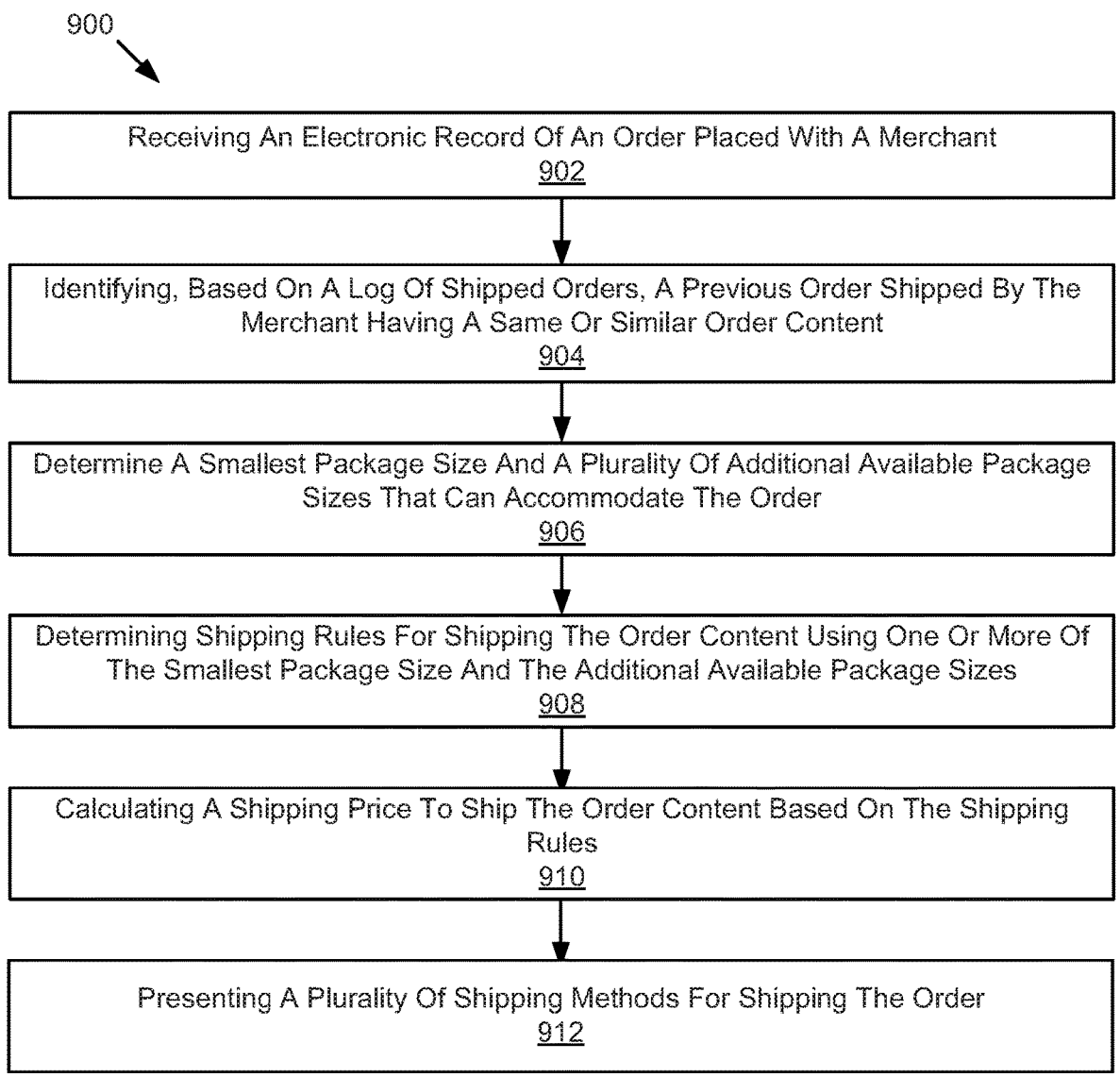
FIG. 9 is a schematic block diagram illustrating a method for determining shipping rules or a shipping method for an order, according to one implementation.

Referring now to FIG. 9, a schematic flow chart diagram of a method 900 for determining shipping rules or a shipping method for an order, according to one embodiment, is illustrated. The method 900 may be performed by an order fulfillment system or shipping component, such as the order fulfillment system 102 of FIG. 1 or the shipping component 104 of FIG. 1 or 2.

The method 900 begins and an order component 202 receives 902 an electronic record of an order placed with a merchant. The electronic record may include an order content comprising a plurality of items for the order. A previous order component 208 identifies 904, based on a log of shipped orders, a previous order shipped by the merchant that includes similar order content to the order content of the order. A package size component 210 determines 906, based on the previous order, a smallest package size in which the order can ship and a plurality of available package sizes for the merchant in addition to the smallest package size that can accommodate the order. A shipping rules component 212 automatically determines 908 shipping rules that include packaging dimensions and a final shipping weight for one or more of the smallest available package size and the one or more additional available package sizes. A shipping price component 214 calculates 910, for one or more of the smallest available package size and the one or more additional available package sizes, a shipping price to ship the order content based on the shipping rules. An interface component 216 presents 912 a plurality of shipping methods to a user on a shipping method page for shipping the order. For example, the shipping methods may include shipping methods for a plurality of different box sizes, different carriers, and the like.

Figure 10:
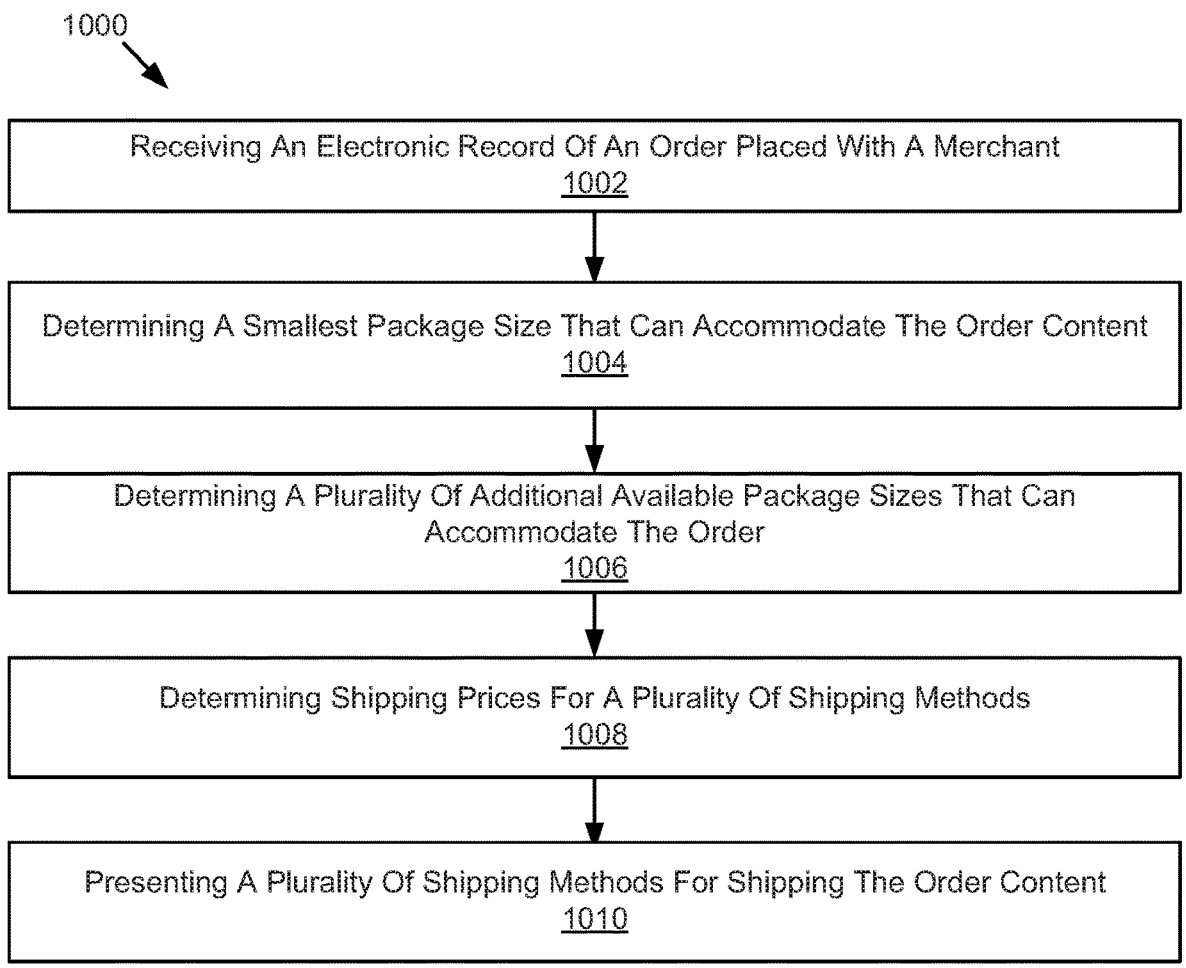
FIG. 10 is a schematic block diagram illustrating another method for determining shipping rules or a shipping method for an order, according to one implementation.

FIG. 10 is a schematic flow chart diagram of a method 1000 for determining shipping rules or a shipping method for an order, according to one embodiment. The method 1000 may be performed by an order fulfillment system or shipping component, such as the order fulfillment system 102 of FIG. 1 or the shipping component 104 of FIG. 1 or 2.

The method 1000 begins and an order component 202 receives 1002 an electronic record of an order placed with a merchant. The electronic record may include an order content comprising a plurality of items for the order. A package size component 210 determines 1004, based on the previous order, a smallest package size in which the order can ship. The package size component 210 also determines 1006 a plurality of available package sizes for the merchant in addition to the smallest package size that can accommodate the order. A shipping price component 214 determines 1008, for one or more of the smallest available package size and the one or more additional available package sizes, a shipping price to ship the order content based on the shipping rules. An interface component 216 presents 1010 a plurality of shipping methods to a user on a shipping method page for shipping the order. For example, the shipping methods may include shipping methods for a plurality of different box sizes, different carriers, and the like with associated shipping costs and/or packaging sizes.

EXAMPLES

The following examples pertain to further embodiments.

Example 1 is a computer implemented method that includes receiving an electronic record of an order placed with a merchant, wherein the electronic record indicates an order content comprising a plurality of items for the order. The method includes determining a smallest available package size in which the order content can be shipped. The method also includes automatically determining, based on the smallest available package size in which the order content can be shipped, one or more additional available package sizes having dimensions larger than the smallest available package size in which the order content can be shipped. The method includes calculating, for each of the smallest available package size and the one or more additional available package sizes, a shipping price to ship the order content. The method includes presenting a plurality of shipping methods for shipping for each of the plurality of available package sizes having shipping rules, wherein each of the plurality of shipping methods comprises a package identifier and a shipping price.

In Example 2, the method of Example 1 further includes identifying a lowest cost package from the plurality of available package sizes, wherein the lowest cost package comprises larger dimensions than the smallest available package size, and wherein presenting the plurality of shipping methods comprises providing a shipping method utilizing the lowest cost package as a default selection.

In Example 3, one or more of the one or more additional available package sizes in any of Examples 1-2 includes one or more of a size of a flat rate package for flat rate shipping or a size of a regional rate package for regional rate shipping.

In Example 4, the method of any of Examples 1-3 further include identifying, from a log of shipped orders, a previous order shipped by the merchant including a same order content as the order content of the order. The same order content may include a same one or more products and a same quantity for the one or more products as the order content of the order and one or more of determining the smallest available package size and determining one or more additional available package sizes comprises determining based on the previous order.

In Example 5, the method of Example 4 includes determining a weight for the previous order and wherein calculating a shipping price includes calculating based on the weight for the previous order.

In Example 6, the method of any of Examples 1-5 further include identifying, from a log of shipped orders, a previous order shipped by the merchant comprising a similar order content as the order content of the order. The similar order content includes a same quantity of products and the same quantity of products include a similar shipping profile. Furthermore, one or more of determining the smallest available package size and determining one or more additional available package sizes includes determining based on the previous order.

In Example 7, the similar shipping profile of Example 6 includes a plurality of matching dimensions with the products of the order content.

In Example 8, the similar shipping profile of Example 6 includes a dimensions within a threshold size of dimensions of the products of the order content.

In Example 9, the method of any of Examples 6-8 further include determining a weight for the previous order and calculating a shipping price includes calculating based on the weight for the previous order and a difference in weight between one or more products of the order and one or more products of the previous order.

In Example 10, the method of any of Examples 1-9 further include logging, to a previous order log, one or more of: the order content of the order; dimensions for products within the order content; the smallest available package size; the one or more additional available package sizes; and a final shipping weight for at least one of the plurality of available package sizes.

In Example 11, the method of any of Examples 1-10 further include identifying one or more products in the order that correspond to a brand or product marked for dropshipping and eliminating one or more products from the order content for one or more of determining the smallest available package size, determining the one or more additional available package sizes, calculating the shipping price, and presenting the plurality of options for shipping.

Example 12 is a machine learning system that includes an order component, a previous order component, a package size component, a shipping rules component, and a shipping price component. The order component is configured to receive an electronic record of an order placed with a merchant, wherein the electronic record includes an order content comprising a plurality of items for the order. The previous order component is configured to identify, based on a log of shipped orders, a previous order shipped by the merchant including a similar order content to the order content of the order. The package size component is configured to automatically determine, based on the previous order, a smallest package size in which the order can ship and a plurality of available package sizes for the merchant in addition to the smallest package size that can accommodate the order. The shipping rules component is configured to automatically determine shipping rules including packaging dimensions and a final shipping weight for each of the smallest available package size and the one or more additional available package sizes. The shipping price component is configured to calculate, for each of the smallest available package size and the one or more additional available package sizes, a shipping price to ship the order content based on the shipping rules. The interface component is configured to present a plurality of shipping methods on a shipping method page for shipping each of the plurality of available package sizes, each of the plurality of shipping methods comprising a package identifier and the shipping price.

In Example 13, the previous order component of Example 12 is configured to identify the previous order based on the order content of the order include a same one or more products and a same quantity for the one or more products as the previous order. The shipping rules component is configured to determine the final shipping weight for at least one of the smallest available package size and the one or more additional available package sizes including a same final shipping weight as the previous order.

In Example 14, the previous order component of any of Examples 12-13 is configured to identify the previous order based on the order content of the order comprising a different one or more products and a same quantity of products as the previous order. The different one or more products have dimensions within a threshold size or percentage of corresponding products in the previous order. The shipping rules component is configured to determine the final shipping weight for at least one of the smallest available package size and the one or more additional available package sizes by substituting a weight for product of the previous order with a weight of a product of the order.

In Example 15, the system of any of Examples 12-14 includes a product profiles component configured to store shipping profiles for a plurality of products available for shipping by the merchant. The shipping profiles include dimensions and weight for each of the plurality of products available for shipping by the merchant.

In Example 16, the order in any of Examples 12-1 includes a first order and wherein the order component is further configured to receive an electronic record of a second order placed with the merchant. The previous order component is configured to determine that there is not a previous order having a similar order content to the second order based on an order log. The interface component displays a shipping rules page for the second order, the shipping rules page providing an interface for a user to input shipping rules comprising one or more of one or more packaging sizes and a final shipping weight. For the first order, the system skips the shipping rules page and automatically generates the shipping rules based on the previous order.

In Example 17, the interface component of Example 16 is configured to receive a selection of a smallest package size for the second order from a user. The package size component is configured to automatically determine, based on the smallest package size for the second order, one or more available package sizes for the second order in addition to the smallest package size for the second order. The interface component is configured to automatically update the shipping rules page to indicate that the one or more available package sizes for second order can accommodate the second order.

In Example 18, the shipping price component in any of Examples 12-17 is configured to identify a shipping method having a lowest shipping price. In one embodiment, the shipping method with the lowest shipping price includes larger dimensions than the smallest available package size, and presenting the plurality of shipping methods comprises providing the lowest shipping price as a default selection.

In Example 19, one or more of the one or more additional available package sizes in any of Examples 12-18 includes one or more of a size of a flat rate package or a size of a regional rate package.

In Example 20, the system of any of Examples 12-19 further includes a label component configured to automatically populate fields of an electronic label based on a selected shipping method and print a label for the order.

In Examples 21, the shipping rules component of any of Examples 12-20 is further configured to identify one or more products in the order that correspond to a brand or product marked for drop-shipping and eliminate one or more products from the order content for one or more of determining the smallest available package size, determining the one or more additional available package sizes, calculating the shipping price, and presenting the plurality of options for shipping.

Example 22 is computer readable storage media storing instructions that, when executed by one or more processors, cause the one or more processors to receive an electronic record of an order placed with a merchant, wherein the electronic record includes an order content for the order. The instructions cause the one or more processors to identify, based on a log of shipped orders, a previous order shipped by the merchant that includes a similar order content to the order content of the order. The instructions cause the one or more processors to automatically determine, based on the previous order, a smallest package size in which the order can ship and a plurality of available package sizes for the merchant in addition to the smallest package size that can accommodate the order. The instructions cause the one or more processors to automatically determine shipping rules that include packaging dimensions and a final shipping weight for each of the smallest available package size and the one or more additional available package sizes. The instructions cause the one or more processors to determine, for each of the smallest available package size and the one or more additional available package sizes, a shipping price to ship the order content based on the shipping rules. The instructions cause the one or more processors to print a label for a package size corresponding to a lowest cost shipping method, wherein the package size for the lowest cost shipping method includes larger dimensions than the smallest available package size.

In Example 23, identifying the previous order in Example 22 includes identifying based on the order content of the order including a same one or more products and a same quantity for the one or more products as the previous order. Additionally, determining the final shipping weight includes determining for at least one of the smallest available package size and the one or more additional available package sizes including a same final shipping weight as the previous order.

In Example 24, identifying the previous order in any of Examples 22-23 includes identifying based on the order content of the order including a different one or more products and a same quantity of products as the previous order. The different one or more products have dimensions within a threshold size or percentage of corresponding products in the previous order. Determining the final shipping weight includes determining, for at least one of the smallest available package size and the one or more additional available package sizes, by substituting a weight for a product of the previous order with a weight of a product of the order.

In Example 25, the instructions in any of Examples 22-24 further cause the one or more processors to store shipping profiles for a plurality of products available for shipping by the merchant, wherein the shipping profiles include dimensions and weight for each of the plurality of products available for shipping by the merchant.

On Example 26, the order in any of Examples 22-25 includes a first order and the instructions further cause the one or more processors to: receive an electronic record of a second order placed with the merchant; determine that there is not a previous order having a similar order content to the second order; display a shipping rules page for the second order, the shipping rules page providing an interface for a user to input shipping rules comprising one or more of one or more packaging sizes and a final shipping weight; receive a selection of a smallest package size for the second order from a user; determine, based on the smallest package size for the second order, one or more available package sizes for the second order in addition to the smallest package size for the second order; and automatically update the shipping rules page to indicate that the one or more available package sizes for second order can accommodate the second order; wherein, for the first order, the instructions cause the processor to skip the shipping rules page and automatically generate the shipping rules based on the previous order.

In Example 27, one or more of the one or more additional available package sizes of any of Examples 22-26 include one or more of a size of a flat rate package or a size of a regional rate package.

In Example 28, determining the shipping price in any of Examples 22-27 includes causing the one or more processors to send one or more shipping rules to an API and receive a price for the order based on the shipping rules.

Example 29 is a system or device that includes means for implementing a method or realizing a system or apparatus in any of Examples 1-28.

In the present disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A computer implemented method comprising:
receiving, by a processor, an electronic record of an order to be shipped by a merchant, wherein the electronic record of the order comprises order content and a mailing address;
determining, by the processor, a smallest available and in-stock package in which the order content can be shipped;
determining, by connecting to an application program interface for each of one or more shipping carriers, a first shipping cost for shipping the smallest available and in-stock package to the mailing address using a lowest cost shipping carrier of the one or more shipping carriers;
calculating a first total shipping price by summing the first shipping cost and a non-zero cost of the smallest available and in-stock package itself;
determining, by the processor, a smallest flat rate package in which the order content can be shipped, wherein a cost of the smallest flat rate package itself is zero;
determining a second shipping cost for the order by connecting to an application program interface for a shipping carrier of the smallest flat rate package and receiving a shipping rate from the shipping carrier;
calculating a second total shipping price based on the second shipping cost and the zero cost of the smallest flat rate package itself; and
comparing, by the processor, the first total shipping price and the second total shipping price to determine a lowest total cost shipping price considering the non-zero cost of the smallest available and in-stock package itself and the zero cost of the smallest flat rate package itself.

2. The method of claim 1, wherein the smallest flat rate package comprises larger dimensions than the smallest available and in-stock package.

3. The method of claim 1, further comprising identifying, from a log of shipped orders, a previous order shipped by the merchant comprising a same quantity of products as the order content, and wherein the same quantity of products comprises a different one or more products having dimensions within a threshold size of dimensions of the order content.

4. The method of claim 3, wherein determining the smallest available and in-stock package in which the order content can be shipped and determining the smallest flat rate package in which the order content can be shipped comprises determining based on the previous order.

5. The method of claim 1, further comprising determining a weight for the order content and wherein calculating the first total shipping price comprises calculating further based on the weight for the order content.

6. The method of claim 1, further comprising generating a shipping profile for the order content comprising dimensions for the order content.

7. The method of claim 1, further comprising logging, to a previous order log, one or more of:
the order content of the order;
dimensions for products within the order content;
dimensions for the smallest available and in-stock package; and
the flat rate package.

8. The method of claim 1, further comprising identifying one or more products in the order that correspond to a brand or product marked for drop-shipping and eliminating one or more products from the order content for one or more of determining the smallest available and in-stock package size, determining the smallest flat rate package, calculating the shipping price, and presenting the plurality of options for shipping.

9. A computing system comprising:
a processor; and
non-transitory computer readable storage media, communicatively coupled to the processor, and storing instructions which, upon execution by the computing system, cause the computing system to perform steps comprising:
receiving, by the processor, an electronic record of an order to be shipped by a merchant, wherein the electronic record of the order comprises order content and a mailing address;
determining, by the processor, a smallest available and in-stock package in which the order content can be shipped;
determining, by connecting to an application program interface for each of one or more shipping carriers, a first shipping cost for shipping the smallest available and in-stock package to the mailing address using a lowest cost shipping carrier of the one or more shipping carriers;
calculating a first total shipping price by summing the first shipping cost and a non-zero cost of the smallest available and in-stock package itself;
determining, by the processor, a smallest flat rate package in which the order content can be shipped, wherein a cost of the smallest flat rate package itself is zero;
determining a second shipping cost by connecting to an application program interface for a shipping carrier of the smallest flat rate package and receiving a shipping rate from the shipping carrier;
calculating a second total shipping price based on the second shipping cost and the zero cost of the smallest flat rate package itself; and
comparing the first total shipping price and the second total shipping price to determine a lowest total cost shipping price considering the non-zero cost of the smallest available and in-stock package itself and the zero cost of the smallest flat rate package itself.

10. The computing system of claim 9, wherein the smallest flat rate package comprises larger dimensions than the smallest available and in-stock package.

11. The computing system of claim 9, wherein the instructions further comprise storing shipping profiles for a plurality of products available for shipping by the merchant, wherein the shipping profiles comprise dimensions and weight for each of the plurality of products available for shipping by the merchant.

12. The computing system of claim 9, wherein the order comprises a first order and wherein the instructions further comprise:
   receiving an electronic record of a second order placed with the merchant;
   determining that there is not a previous order shipped by the merchant comprising a same quantity of products as the order content to the second order, and wherein the same quantity of products comprises a different one or more products having dimensions within a threshold size of dimensions of the products of the order content to the second order; and
   displaying a shipping rules page for the second order, the shipping rules page providing an interface for a user to input shipping rules comprising one or more of one or more packaging sizes and a final shipping weight;
   wherein, for the first order, the processor skips the shipping rules page and automatically generates shipping rules based on a previous order.

13. The computing system of claim 12, wherein the instructions further comprise:
   receiving a selection of a smallest package size for the second order from a user;
   automatically determining, based on the smallest package size for the second order, one or more available package sizes for the second order in addition to the smallest package size for the second order; and
   automatically updating a shipping rules page to indicate that the one or more available package sizes for the second order can accommodate the second order.

14. The computing system of claim 9, wherein the instructions further comprise identifying, based on a log of shipped orders, a previous order shipped by the merchant, wherein the previous order comprises a same quantity of products as the order content, and wherein the same quantity of products comprises a different one or more products having dimensions within a threshold size of dimensions of the products of the order content.

15. The computing system of claim 9, wherein the instructions further comprise automatically determining shipping rules comprising packaging dimensions and a final shipping weight for each of the smallest available and in-stock package and the smallest flat rate package.

16. The computing system of claim 9, wherein the instructions further comprise presenting on a display a plurality of shipping methods on a shipping page for shipping each of a plurality of package sizes including the smallest available and in-stock package and the smallest flat rate package.

17. The computing system of claim 9, wherein the instructions further comprise identifying one or more products in the order that correspond to a brand or product marked for drop-shipping and eliminating one or more products from the order content for one or more of determining the smallest available and in-stock package size or determining the flat rate package.

18. Non-transitory computer readable storage media storing instructions thereon that, upon execution by one or more processors, cause the one or more processors to perform steps comprising:
   receive an electronic record of an order to be shipped by a merchant, wherein the electronic record of the order comprises order content and a mailing address;
   determine a smallest available and in-stock package in which the order content can be shipped;
   determine, by connecting to an application program interface for each of one or more shipping carriers, a first shipping cost for shipping the smallest available and in-stock package to the mailing address using a lowest cost shipping carrier of the one or more shipping carriers;
   calculate a first total shipping price by summing the first shipping cost and a non-zero cost of the smallest available and in-stock package itself;
   determine a smallest flat rate package in which the order content can be shipped, wherein a cost of the smallest flat rate package itself is zero;
   determine a second shipping cost for the order by connecting to an application program interface for a shipping carrier of the smallest flat rate package and receiving a shipping rate from the shipping carrier;
   calculate a second total shipping price based on the second shipping cost and the zero cost of the smallest flat rate package itself; and
   compare the first total shipping price and the second total shipping price to determine a lowest total cost shipping price considering the non-zero cost of the smallest available and in-stock package itself and the zero cost of the smallest flat rate package itself.

19. The non-transitory computer readable storage of claim 18, wherein the smallest flat rate package comprises larger dimensions than the smallest available and in-stock package.

20. The non-transitory computer readable storage of claim 18, wherein the instructions further cause the one or more processors to store shipping profiles for a plurality of products available for shipping by the merchant, wherein the shipping profiles comprise dimensions and weight for each of the plurality of products available for shipping by the merchant.

21. The non-transitory computer readable storage of claim 18, wherein the order comprises a first order and wherein the instructions further cause the one or more processors to:
   receive an electronic record of a second order placed with the merchant;
   determine that there is not a previous order shipped by the merchant comprising a same quantity of products as the order content to the second order, and wherein the same quantity of products comprises a different one or more products having dimensions within a threshold size of dimensions of the products of the order content to the second order;
   display a shipping rules page for the second order, the shipping rules page providing an interface for a user to input shipping rules comprising one or more of one or more packaging sizes and a final shipping weight;
   receive a selection of a smallest package size for the second order from a user;
   determine, based on the smallest package size for the second order, one or more available package sizes for the second order in addition to the smallest package size for the second order; and
   automatically update the shipping rules page to indicate that the one or more available package sizes for second order can accommodate the second order;
   wherein, for the first order, the instructions cause the processor to skip the shipping rules page and automatically generate the shipping rules based on the previous order.

22. The non-transitory computer readable storage of claim 18, wherein the instructions further cause the one or more processors to identify, based on a log of shipped orders, a previous order shipped by the merchant, wherein the previous order comprises a same quantity of products as the order content, and wherein the same quantity of products comprises a different one or more products dimensions within a threshold size of dimensions of the products of the order content.

23. The non-transitory computer readable storage of claim 18, wherein determining either of the first total shipping price or the second total shipping price comprises causing the one or more processors to:
   send one or more shipping rules to an application program interface (API); and
   receive a price for the order based on the shipping rules.

* * * * *